Figure 3:
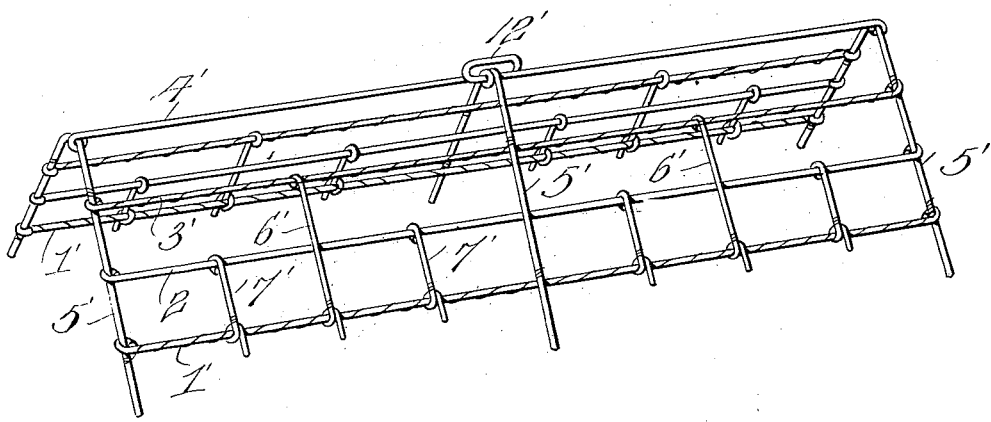

S. D. SCOTT.
PLANT PROTECTOR.
APPLICATION FILED MAY 20, 1908.
912,184.
Patented Feb. 9, 1909.
2 SHEETS—SHEET 1.
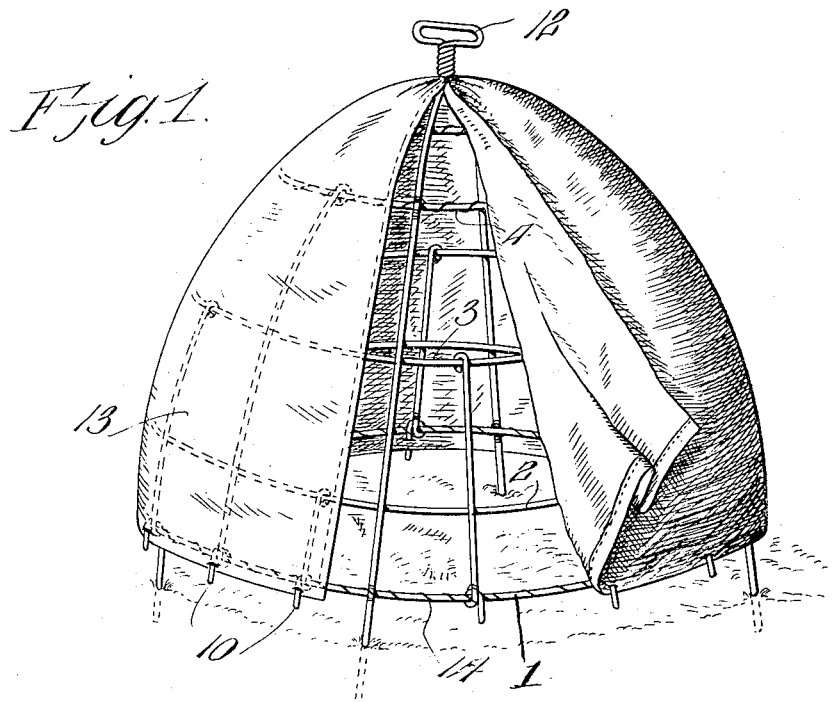
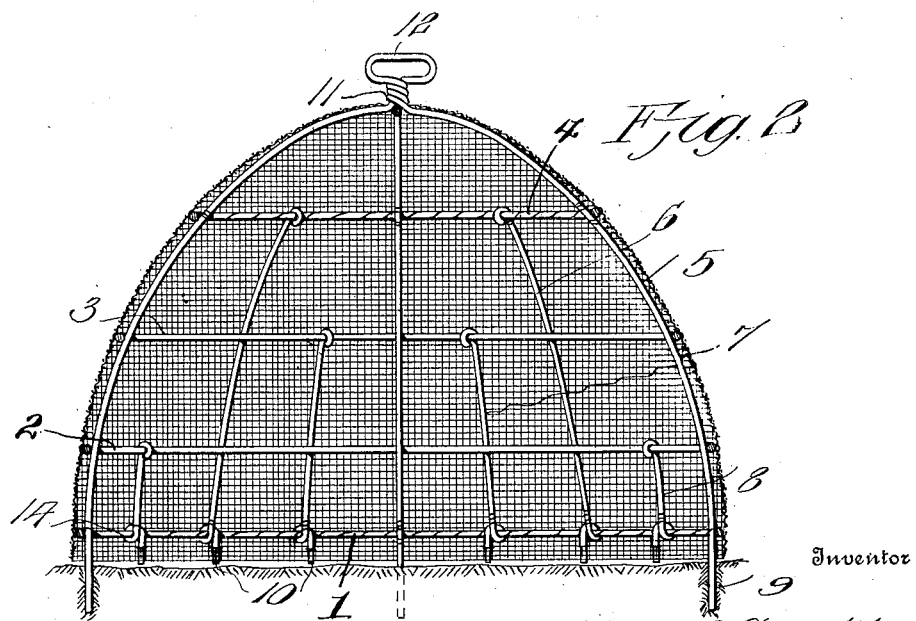

S. D. SCOTT.
PLANT PROTECTOR.
APPLICATION FILED MAY 20, 1908.

912,184.

Patented Feb. 9, 1909.
2 SHEETS—SHEET 2.

Inventor
Stephen D. Scott,

Witnesses
Frank Hough.
P. M. Smith,

By Victor J. Evans
Attorney

UNITED STATES PATENT OFFICE.

STEPHEN D. SCOTT, OF HOWEVALLEY, KENTUCKY.

PLANT-PROTECTOR.

No. 912,184.  Specification of Letters Patent.  Patented Feb. 9, 1909.

Application filed May 20, 1908. Serial No. 433,886.

*To all whom it may concern:*

Be it known that I, STEPHEN D. SCOTT, a citizen of the United States, residing at Howevalley, in the county of Hardin and State of Kentucky, have invented new and useful Improvements in Plant-Protectors, of which the following is a specification.

This invention relates to plant protectors, the object in view being to provide a simple, portable and durable protector or hood adapted to cover and protect from the weather, one or more plants, the protector when in position serving as an effective shelter for the plants from cold and biting winds and frost in the early spring as well as serving as a protection from the hot sun and insects in the summer season, the protector also shading the earth or soil around the plant or plants so as to retain the moisture in the soil and prevent the baking of the same to the injury of the plants.

With the above and other objects in view, the nature of which will more fully appear as the description proceeds, the invention consists in the novel construction, combination and arrangement of parts as herein fully described, illustrated and claimed.

In the accompanying drawings:—Figure 1 is a perspective view of a single plant protector embodying the present invention. Fig. 2 is a vertical sectional view of the same. Fig. 3 is a perspective view of the frame of a protector for several plants.

In the smaller form of protector as shown in Figs. 1 and 2, wherein said protector is adapted for a single plant or cluster of plants, the device comprises a frame which is substantially hemispherical in shape, the frame comprising a series of stringer wires 1, 2, 3 and 4. In the single form of protector these stringer wires are circular and of varying diameter, the lower stringer wires being the larger and the succeeding upper stringer wires being progressively less in diameter to impart the hemispherical form of the complete protection. At suitable intervals the stringer wires are connected to relatively braced stay wires 5, 6, 7 and 8 and it will be noted that the stay wires 5 extend from the top to the bottom of the framework and below the lower stringer so as to form extensions or feet 9 adapted for insertion in the ground as clearly indicated in Figs. 1 and 2, whereby the protector is effectually anchored to withstand the action of strong winds.

The stay wires 6 are shorter than the stay wires 5 and extend from the top stringer to the bottom stringer. Other stay wires 7 extend from the bottom stringer to the stringer which is next below the top one while the remaining stay wires 8 extend from the lower stringer to the next stringer above the lowest one. By this arrangement, the stringer wires are braced relatively to each other without unnecessary weight or waste of material and all of the stay wires are coiled or wrapped around the lower stringer wire and extended sufficiently below the same to form impaling prongs 10. The stay wires 5 are twisted together as shown at 11 at the top of the frame and fashioned into a top loop 12 which constitutes a handle by means of which the protector may be carried and set over the plant and embedded in the ground.

The cover 13 may be of any desired textile material of suitable weight and fineness of mesh and is given a general shape of the frame so as to fit thereover as shown in Figs. 1 and 2, the lower edge of the cover being impaled upon the prongs 10 as clearly indicated in Fig. 1. Where the stay wires cross and intersect with the stringer wires, such wires may be soldered or otherwise firmly connected together. A preferred way of accomplishing the same result however, consists in wrapping a fine wire 14 around suitable stringer wires as shown in Figs. 1 and 2 and also around the stay wires where they intersect or wrap around the stringer wires, the wires 14 serving to prevent relative slippage between the stay and stringer wires and keeping all parts of the frame in their proper relative places.

In the preferred form in Fig. 3, the protector comprises the inverted V-shaped stay wires 5' at the ends and center of the protector and the intermediate stay wires 6' and 7' of different lengths connecting different sets of stringer wires 1', 2', 3' and 4', the relative arrangement of the stringer wires and stay wires being identical with the arrangement shown in Figs. 1 and 2 with the exception that in Fig. 3 the stringer wires are practically straight while in Figs. 1 and 2 the stringer wires are in the form of bands or rings. The protector shown in Fig. 3 is also provided with a loop shaped handle 12' to facilitate carrying the protector from place to place and planting the same in the ground.

I claim:—

1. A plant protector comprising a plurality of stringer wires, a series of stay wires extending across and connecting the stringer wires and projecting below the lowermost stringer wire to form anchor feet and impaling prongs, and a flexible and detachable cover arranged over said frame and having the marginal edges thereof impaled on said prongs.

2. A plant protector comprising a plurality of stay wires, a series of parallel stringer wires connecting the stay wires and secured thereto, a top loop formed by the stay wires, anchoring feet formed by projecting certain stay wires below the lowermost stringer wire, cover impaling prongs formed by extending other stay wires below the lowermost stringer wire, and a flexible and detachable cover having its marginal edges impaled on said prongs.

In testimony whereof I affix my signature in presence of two witnesses.

STEPHEN D. SCOTT.

Witnesses:
CORA RICHARDSON,
H. H. WRIGHT.